United States Patent [19]

Kawakami et al.

[11] Patent Number: 4,581,810

[45] Date of Patent: Apr. 15, 1986

[54] METHOD AND APPARATUS FOR CONTROLLING TOOL MAGAZINES

[75] Inventors: Toshio Kawakami, Zama; Izumi Kimura, Numazu, both of Japan

[73] Assignee: Toshiba Kikai Kabushiki Kaisha, Tokyo, Japan

[21] Appl. No.: 574,263

[22] Filed: Jan. 26, 1984

Related U.S. Application Data

[63] Continuation-in-part of Ser. No. 335,715, Dec. 29, 1981, abandoned.

[30] Foreign Application Priority Data

Jan. 9, 1981 [JP] Japan .................................. 56-1920

[51] Int. Cl.[4] ........................ B23Q 3/157; G06F 13/46
[52] U.S. Cl. ..................................... 29/568; 29/26 A; 29/426.3; 211/1.5; 364/474
[58] Field of Search .................... 29/26 A, 568, 426.3; 211/1.5; 318/602; 408/35; 364/474

[56] References Cited

U.S. PATENT DOCUMENTS

| | | | |
|---|---|---|---|
| 3,744,124 | 7/1973 | Gardner | 29/568 |
| 4,107,589 | 8/1978 | Eto et al. | 29/568 X |
| 4,109,188 | 8/1978 | Shima et al. | 29/568 X |

Primary Examiner—Z. R. Bilinsky
Attorney, Agent, or Firm—Koda and Androlia

[57] ABSTRACT

A tool magazine is divided into four regions respectively containing substantially the same number of tool pots. When a designated tool is contained in a first or fourth region the magazine is rotated in the clockwise direction to index the designated tool to a tool exchange position, whereas when the designated tool is contained in a second or third region the magazine is rotated in the counterclockwise direction. Designation of a desired tool, the direction of rotation of the magazine and number of steps of the magazine are controlled by a computer including a memory having a comparison table written with correspondences between tool numbers and absolute tool pot numbers. According to a modified embodiment, the tool magazine is provided with two tool exchange positions between adjacent regions and on one side thereof, and the tool exchanger is selectively moved to either one of the tool exchange positions.

13 Claims, 5 Drawing Figures

METHOD AND APPARATUS FOR CONTROLLING TOOL MAGAZINES

CROSS REFERENCE TO RELATED APPLICATION

This application is a continuation-in-part of application Ser. No. 335,715 filed Dec. 29, 1981, now abandoned.

BACKGROUND OF THE INVENTION

This invention relates to a method and apparatus for controlling a tool magazine storing a plurality of tools used in combination with a machine tool and an automatic tool exchange device, and more particularly a method and apparatus for controlling a tool magazine capable of indexing a designated one of the tools to be used next time to a tool exchange position with a minimum travel or rotation of the tool magazine.

Typical prior art methods and apparatuses for controlling a tool magazine of this type are as follows:

1. A data control system disclosed in U.S. Pat. No. 3,173,204, dated Mar. 16, 1965.

This data control system comprises a plurality of individual record members that are associated with respective tool storage locations in the storage station. Each record member affords a record medium for registering code data identifying an individual tool. Sensing means are provided for sensing the code data recorded on the record members. Means are also provided for clearing the code data from a record member upon removal of the associated tool from the storage station. The code data identifying a tool are stored in a separate data storage means as long as the tool is separated from the tool storage station. The system also includes means coupled to the aforementioned data storage means for automatically recording the identifying code data for a given tool on one of the record members upon transfer of the tool to the storage location that is associated with that record member. Control means are also provided for actuating the transfer means of the machine to transfer selected tools between the storage and work stations, and these control means are coupled to and controlled by the sensing means.

2. An automatic tool searching apparatus as disclosed in Japanese Patent Publication No. 179/81 wherein the pot numbers of a tool magazine and tool numbers received in respective tool pots are sequentially stored in a memory device in an order determined by taking the tool exchange position as a reference, first scanning means which scans the memory device in a direction in which the tool number increases and second scanning means which scans the memory device in a direction in which the tool number decreases are operated alternately, and the results of scannings are sequentially compared with the number of the tool to be used next time. Further, rotation direction judging means is provided which judges the direction of rotation of the tool magazine according to either one of the output signals of the first and second scanning means when a coincidence is obtained.

According to the first prior art reference, the tool magazine is rotated always in the definite direction so that for the purpose of indexing a designated tool in a tool pot located most remotely from the tool exchange position the tool magazine must be rotated about 360°, thus requiring a longer time for indexing. More particularly, it cannot realize the feature of short travel.

In contrast, although the second prior art reference has the short travel performance, it is essential to provide a comparator for detecting the coincidence so that the circuit construction becomes complicated.

SUMMARY OF THE INVENTION

Accordingly, it is an object of this invention to provide an improved method and apparatus for controlling a tool magazine capable of quickly indexing a designated tool to a tool exchanging position by utilizing the short travel rotation feature without requiring complicated calculations or utilizing a complicated circuit including a comparator.

Another object of this invention is to provide a novel method and apparatus for controlling a tool magazine capable of greatly reducing the search time of a designated tool and facilitating detection and exchange of defective tools.

According to one aspect of this invention, there is provided a method of controlling a tool magazine of the type wherein a plurality of tools are mounted on tool pots of the tool magazine and a designated tool is indexed to a tool exchange position under control of a computer including memory means, comprising the steps of dividing the tool magazine into at least three regions each containing a plurality of tool pots for receiving tools of the same type; storing in the memory means, in the form of a comparison table, correspondences between absolute tool pot numbers with reference to the tool exchange position and tool numbers in respective tool pots of respective regions; determining a direction of movement of the tool magazine for respective regions with reference to the tool exchange position; judging a specific region containing a tool designated by a call instruction produced by a recording medium containing a machining program; indexing the judged specific region to the tool exchange position; counting an order of the designated tool in the judged specific region in accordance with the comparison table; moving the magazine in the determined direction by an amount corresponding to the counted order thereby indexing the designated tool to the tool exchange position; and exchanging the designated tool at the tool exchange position with a tool mounted on a machine tool.

According to another aspect of this invention, there is provided apparatus for controlling a tool magazine having a plurality of tool pots each containing a tool, the tool magazine being divided into at least three tool regions respectively containing substantially the same number of tool pots for receiving tools of the same type, the apparatus comprising reversible magazine driving means for sequentially indexing a designated tool to a tool exchange position; a first memory section including a comparison table storing correspondences between absolute tool numbers of respective regions and tool numbers included in respective regions; a second memory section including a first memory region for storing a tool number of a tool mounted on a machine tool, a second memory region for storing an absolute pot number of a tool pot indexed to the tool exchange position, a third memory region for storing the absolute pot number of a tool pot containing the designated tool and a fourth memory region for storing the designated tool number; means for searching the absolute tool pot number storing the designated tool in accordance with the comparison table prior to movement of the tool magazine; means for determining a direction of movement of respective regions of the tool magazine towards the tool exchange position in accordance with the contents of the second memory section; means controlled by the contents of the first and second memory sections for determining an amount of movement of the tool magazine necessary to index the designated tool to the tool exchange position; and magazine drive means controlled by the direction determining means and the movement amount determining means for indexing the designated tool to the tool exchange position.

According to a modified embodiment of this invention the magazine is provided with a plurality of spaced tool exchange positions on one side thereof and between adjacent regions of the magazine and a tool exchanger is selectively moved to either one of the tool exchange positions for decreasing the movement of the magazine when indexing a designated tool to the tool exchange position.

DESCRIPTION OF THE PREFERRED EMBODIMENT

Figure 1:
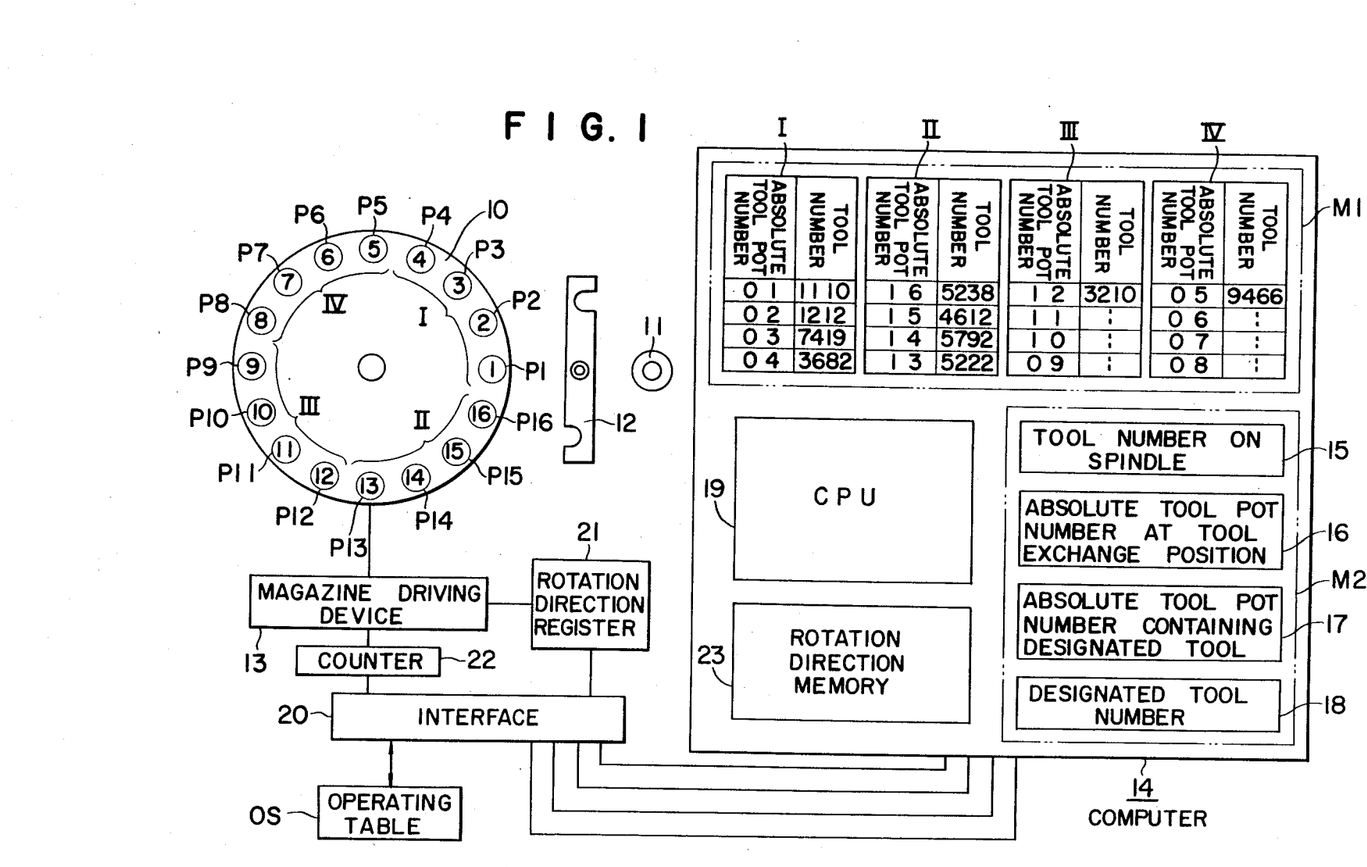
FIG. 1 is a diagrammatic block diagram showing one embodiment of this invention.

A machining center illustrated in FIG. 1 comprises a circular disc shaped tool magazine 10. For the purpose of increasing the tool storage capacity of the tool magazine, various types of the magazines are used including a concentric type in which two or more annular rings are disposed concentrically, and a reentrant or double U shaped endless chain type. Although the invention is applicable to various types of tool magazines, for the purpose of description, a tool magazine of a circular disc type as shown in FIG. 1 will be described hereunder. Along the periphery of the magazine 10 are provided a number of equally spaced pots P1–P16 for removably receiving a plurality of tools 1–16. Although not shown, a dog is provided for a specific pot or the magazine at a reference origin, preferably at a tool exchange position for operating a switch to make the absolute pot number (to be defined later) to correspond to the tool number. Near the tool magazine is situated a machine tool, not shown, having a spindle 11 on which a selected one of the tools stored in the tool magazine 10 is removably mounted. A tool exchanger 12 diagrammatically shown as a rotatable lever having U shaped tool receiving grooves at the opposite ends is provided for exchanging a designated tool in the magazine and indexed to the tool exchange position with a tool on the spindle 11. The tool magazine 10 is rotated in the clockwise and counterclockwise directions, preferably stepwisely, by a magazine driving device 13 for sequentially indexing the designated tool to the tool exchange position, for example P1. The plurality of pots are divided into a plurality of groups or regions I–IV respectively including the same number of pots, that is P1–P4, P13–P16, P9–P12 and P5–P8. It is advantageous to classify the regions I–IV according to the types of the tools, for example, drills, reamers, taps and boring tools, which permits easy checking of the states of the stored tools and exchange thereof. The correspondence between the absolute pot numbers of respective regions and the tool number is stored in a memory device of a computer 14 in the form of a comparison table as will be described later in more detail. The term "absolute pot number" is used herein to mean a predetermined special pot position with reference to a predetermined pot position, advantageously the tool exchange position. The absolute pot number does not vary as the magazine is rotated.

The content of the comparison table is rewritten or updated in accordance with the rotation of the tool magazine so as to sequentially change the correspondence between the absolute tool number in a given group region and the tool number in the table. More particularly, a number assigned to a given tool pot is an absolute pot number irrespective of the rotation of the tool magazine so that only the tool number is rewritten as the tool magazine rotates.

The computer 14 includes two memory sections M1 and M2, the latter comprising a memory region 15 for storing the tool number mounted on the spindle 11, a memory region 16 for storing the absolute tool pot number at the tool exchange position, for example an absolute tool pot number 01, a memory region 17 for storing an absolute pot number containing a tool designated to perform the next machining, and a memory region 18 for storing the designated tool number for performing the next machining.

The other memory section M1 comprises the comparison table in which are stored the correspondences among respective absolute tool pot numbers, 01–04, 16–13, 12–09 and 05–08 and tool numbers in terms of decimal codes 1110–3682, 5238–5222, 3210 . . . , and 9466 . . . .

Figure 2A:
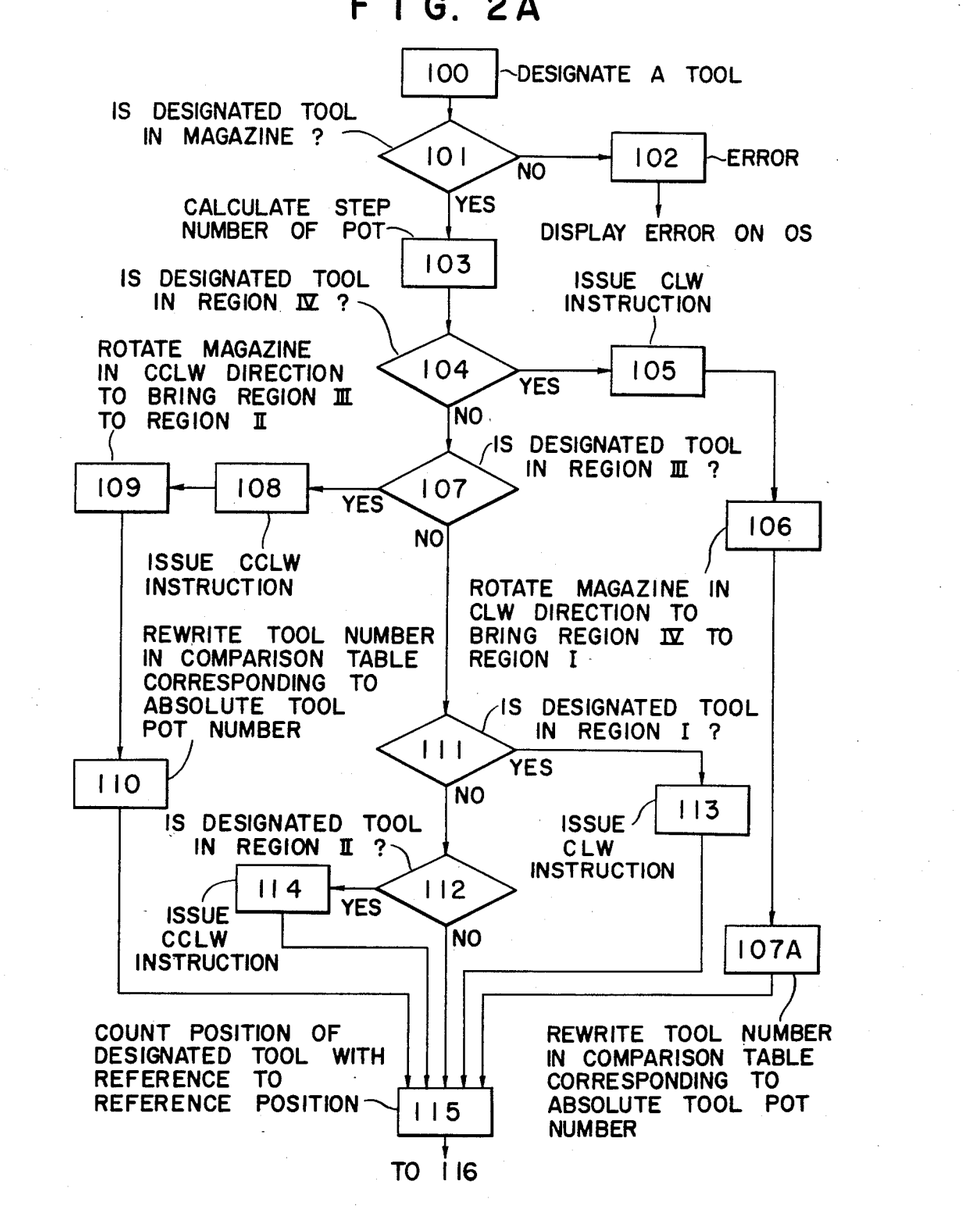
FIGS. 2A and 2B show a flow chart for explaining the operation of this invention.
Figure 2B:
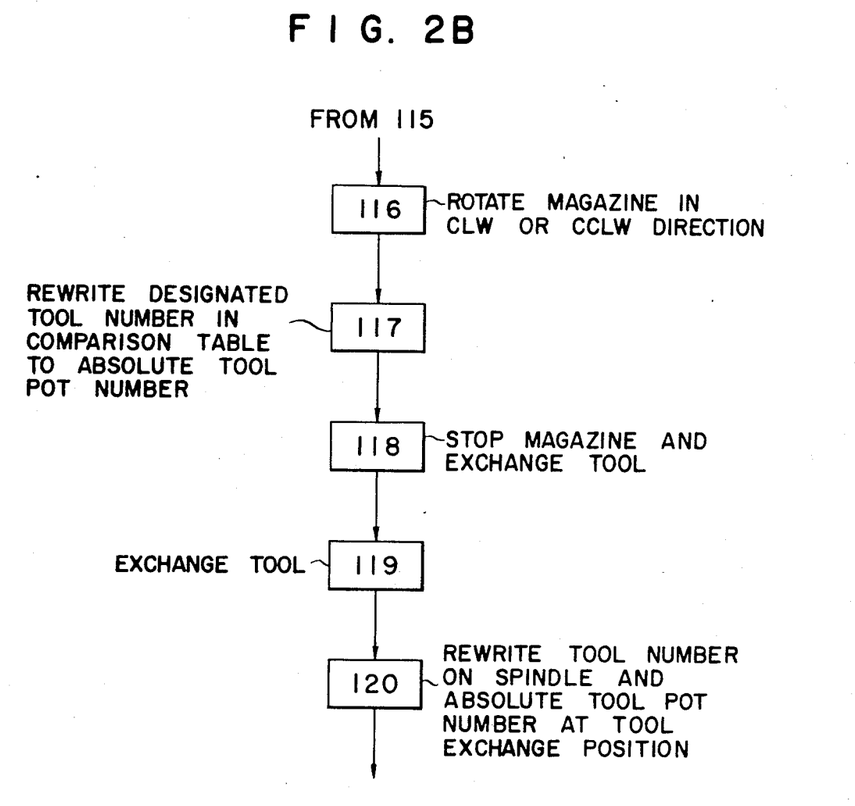

The computer 14 further comprises a central processing unit 19 which executes a program as shown in the flow chart shown in FIGS. 2A and 2B. An operating table OS is disposed near the machine tool and connected to the computer 14 through an interface 20 so that when it is desired to manually or automatically change one or more tools in the tool magazine 10 new tool numbers are stored in the memory section M1. A rotation direction register 21 is interposed between the magazine driving device 13 (step motor) and the interface 20 for applying to the magazine driving device 13 a clockwise or counterclockwise rotation instruction. A counter 22 is connected to the computer 14 via the interface 20 for applying an instruction to the magazine driving device 13. The counter 22 is driven by a clock pulse for determining the order of a tool pot in a given group region and the number of the clock pulses counted represents the number of steps. More particularly, when the tool magazine is rotated for indexing a designated tool to the tool exchange position, the counter 22 counts the number of steps that is the tool pots passed through the tool exchange position until the designated tool arrives at that position. A rotation direction memory device 23 is provided for determining the direction of rotation of the tool magazine in accordance with the group region stored in the comparison table.

The operation of the control apparatus shown in FIG. 1 will now be described with reference to the flow chart shown in FIGS. 2A and 2B. At first, tools corresponding to the absolute pot numbers of the tool magazine are mounted on the corresponding tool pots. Then the operation table OS is operated by an operator to store the tool numbers of the tools in the memory section M1. At step 100 a call instruction for a designated tool is applied by a machining program tape, a punched card or the like. Then, at step 101, a judgement is made as to whether there is the designated tool in the tool magazine. Such judgement may be made sequentially or simultaneously for respective group regions or columns of the comparison table of the memory section Ml. When the result of judgement executed at step 101 is NO, at step 102 an error signal is generated which is displayed on the operating table OS to request the operator to correct the error, whereas when the result is YES, at step 103, the number of steps of the pot is calculated by dividing the total number of the tools in the magazine by the number of the groups. Then, at step 104, a judgement is made as to whether the designated tool presents in a given group region, for example IV or not. When the result of judgement at step 104 is YES, at step 105 a clockwise instruction is issued, and at step 106, the tool magazine is rotated in the clockwise direction to bring the region IV to the position of region I. Then, at step 107A the tool number in the comparison table corresponding to the absolute pot number is rewritten.

When the result of judgement executed at step 104 is NO, at step 107, a judgement is made as to whether the designated tool is contained in the group region III or not. When the result is YES, a counterclockwise rotation instruction is issued at step 108, and at the next step 109 the magazine is rotated in the counterclockwise direction to bring the region III to the position of region II. Then at step 110 the tool number in the comparison table corresponding to the absolute tool pot number is rewritten.

When the result of judgement at step 107 is NO, at step 111 a judgement is made as to whether there is the designated tool in the group region I or not, and when the result is YES, at step 113 a clockwise instruction is given to rotation direction register 21 from the rotation direction memory device 23 whereas when the result is NO, at step 112, a judgement is made as to whether there is the designated tool in the group region II or not. When the result of judgement at step 112 is YES, at step 114 a counterclockwise instruction is applied to rotation direction register from rotation direction memory device 23. At step 113 in accordance with the content of the comparison table, the result of judgement executed at step 112 and the clockwise or counterclockwise instruction, the position or the number of steps of the designated tool from the reference or the tool exchange position is counted by the counter 22. Thus, the tool magazine is rotated in the clockwise or counterclockwise direction. Accordingly, at step 116, the tool magazine driving device 13 is actuated to rotate the magazine 10 in a direction instructed by the output of the rotation direction register 21 by steps of a number corresponding to the count of the counter 22, thus indexing the designated tool to the reference position, that is the tool exchange position P1. Then at step 117 the designated tool number in the comparison table is changed to an absolute pot number. Then, at step 118 the magazine is stopped and the designated tool brought to the tool exchange position P1 is exchanged with a tool on the spindle 11 by tool exchange device 12 at step 119 in a manner well known in the art. Finally, the number of the tool just mounted on the spindle and the absolute pot number at the tool exchanging position are rewritten in the comparison table at step 120.

As above described according to the judgements at steps 104, 107, 111 and 112, the direction of rotation of the tool magazine is determined to be clockwise or counterclockwise. More particularly where the designated tool is contained in regions I or IV, the tool magazine is rotated in the clockwise direction, whereas contained in regions II or III, the tool magazine is rotated in the counterclockwise direction, thus performing so-called short travel.

Although in the foregoing embodiment a number of tool pots was divided into 4 regions respectively containing the same number of pots, in a certain case, especially when the tool magazine takes the form of an endless reentrant or double U shape, it is impossible to divide the magazine into a number of regions each containing the same number of tool pots. However, in accordance with this invention since the comparison table is constructed to store correspondences between respective absolute pot numbers and tool numbers of each region, difference in the number of the tool pots in respective regions does not cause any serious trouble.

Instead of using a step motor as the magazine driving device, where high speed rotation of the magazine is desired, a combination of a rack driven by a bidirectional high speed hydraulic motor and a pinion mounted on the drive shaft of the magazine can be used. In this case, the direction of movement of the hydraulic motor is instructed by the rotation direction register 21 while the stroke of the hydraulic motor is instructed by the counter 22.

As above described, according to this invention since the tool magazine is divided into three or more tool regions and these regions are simultaneously searched to find out the fact that the designated tool is contained in which one of the tool pots, the search time can be reduced to the order of micro-seconds, which also reduces the count time of the counter necessary to count the number of steps. Moreover, as above described, as a principle, since the same type of tools are contained in each region, search of defective or erroneous tool and exchange thereof are easy.

Figure 3:
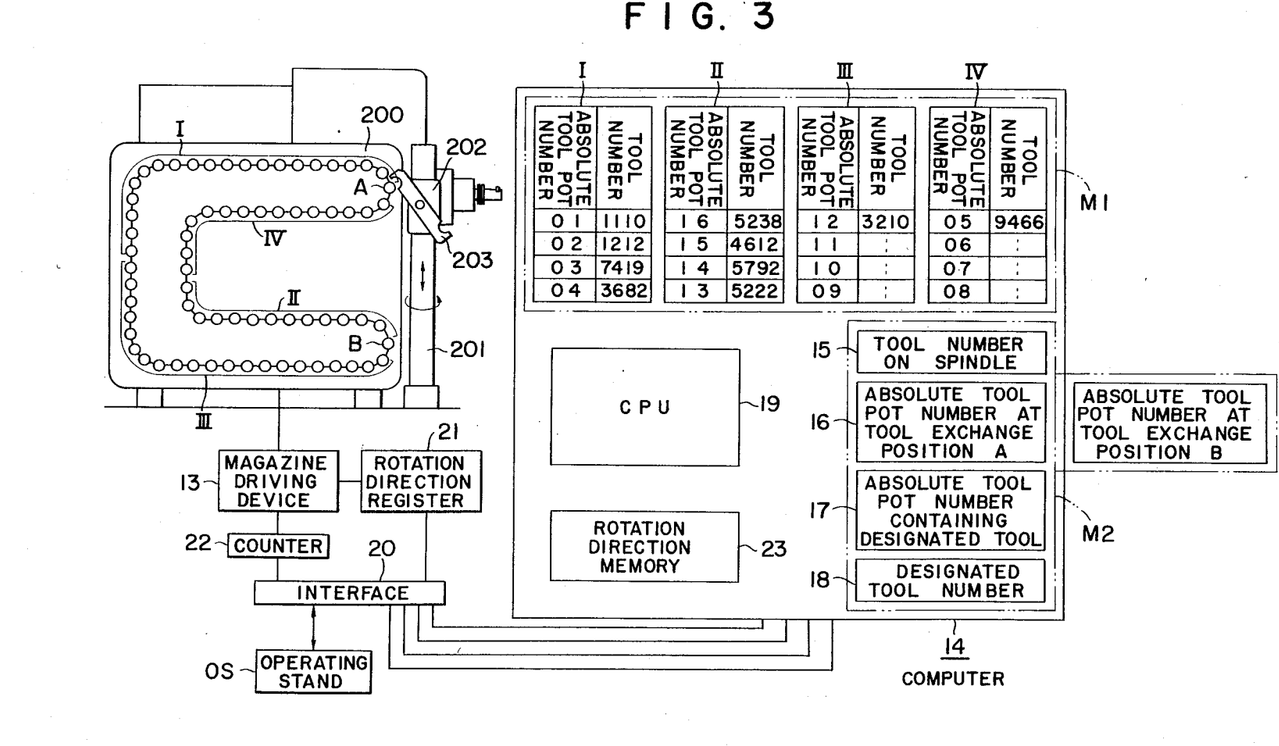
FIG. 3 is a diagrammatic block diagram showing a modified embodiment of this invention.

In another embodiment shown in FIG. 3 there are provided a plurality of (in this example, two) tool exchange positions for the tool storage magazine and a tool exchanger is selectively moved to either one of these positions so as to bring, as far as possible, a designated tool to either one of the tool exchange positions.

In this embodiment, the tool magazine 200 takes the form of a reentrant U shaped endless chain carrying a number of tool pots. The tool magazine 200 is divided into 4 regions I–IV respectively containing substantially the same number of tool pots for receiving tools of the same type. Two spaced tool exchanging positions are provided respectively corresponding to tool pots A and B on one side of the magazine and a tool exchanger 202 is selectively moved to either one of the two tool exchange positions along a vertical column 201 provided close to the front end of the tool magazine 200. The tool exchanger 202 has a tool exchanging arm 203 having tool holding members at both ends. The tool exchanging arm 203 is swung and reciprocated in a direction perpendicular to the axis of the column 201 for removing a designated tool from a tool pot to one of the tool exchanging positions. Then the column 201 is rotated for exchanging the designated tool with a tool on the spindle of a machine tool, and the tool dismounted from the spindle is inserted into the vacant tool pot, in a manner well known in the art.

Although the control circuit and the memory device shown in FIG. 3 are generally identical to those shown in FIG. 1, since two tool exchange positions A and B are provided, the memory region 16 is divided into two areas respectively storing the absolute tool pot numbers at tool exchange positions A and B as shown in FIG. 3.

Figure 4:
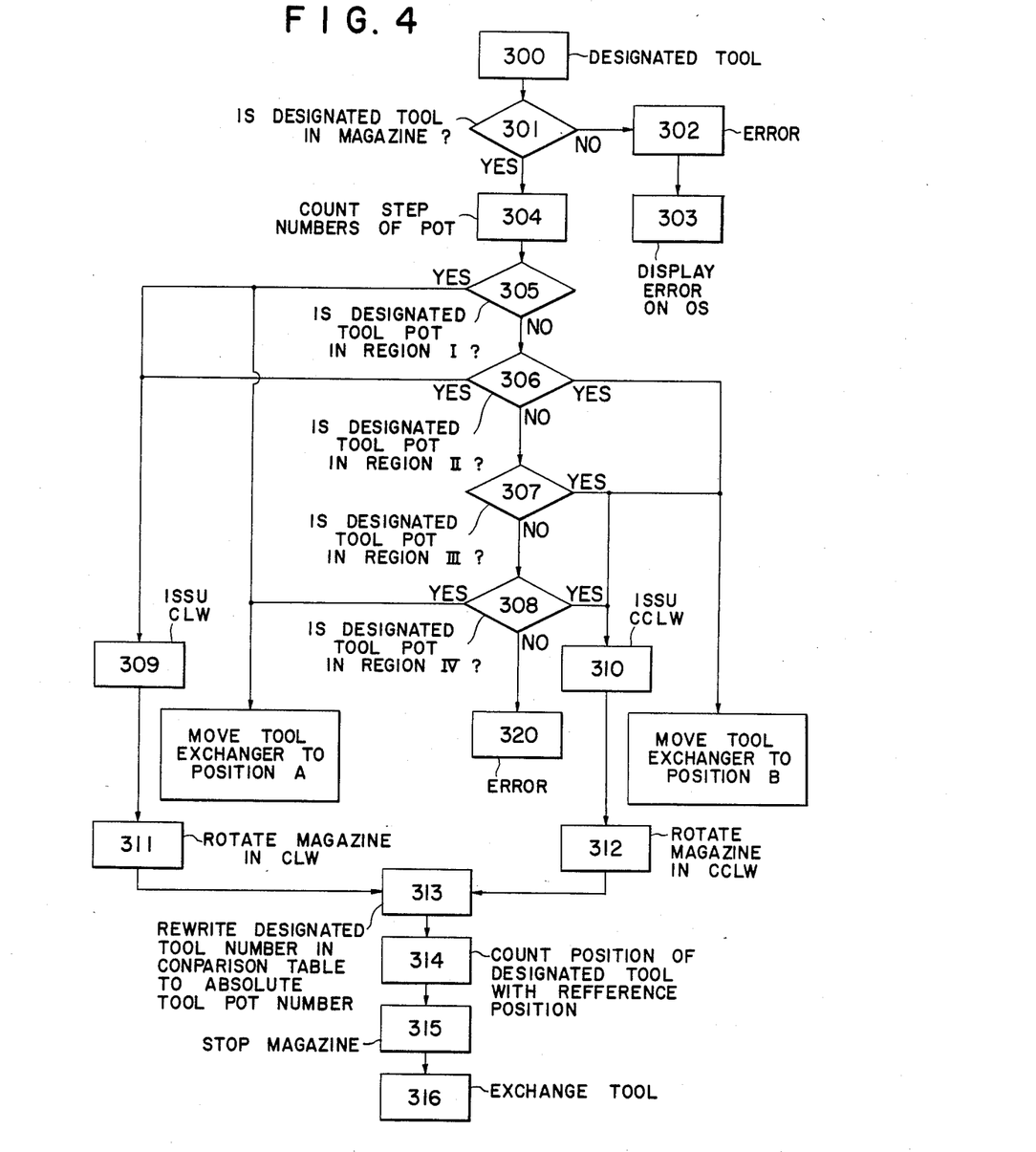
FIG. 4 shows a flow chart for explaining the operation of the modified embodiment shown in FIG. 3.

The operation of the modified embodiment will be described with reference to the flow chart shown in FIG. 4. Before starting the machining operation, at step 300 a desired tool is designated. Then at step 301 a judgement is made as to whether the designated tool is contained in the magazine or not, that is whether the designated tool is stored in the memory device or not. When the result of judgement is NO, at step 302, an error is judged, and at step 303 this error is displayed on operation table OS. When the result of judgement executed at step 301 is YES, at step 304, the position or step number of the designated tool is counted by counter 22 using the tool exchange position A or B as a reference position. Where the tool number of the designated tool is stored in memory section M1, at steps 305, 306, 307 and 308 judgements are made as to whether the corresponding tool number belongs to which one of the groups I, II, III and IV. The directions of rotations are predetermined for respective regions. More particularly, when the result of judgement executed at step 305 is YES, at step 309, a clockwise rotation (CLW) instruction is issued. In the same manner, when the results of judgements executed at steps 307 and 308 are YES, at step 310 a counterclockwise (CCLW) instruction is issued. Then at steps 311 and 312 the tool magazine is rotated in the clockwise direction by the magazine driving device 13. Where the result of judgement at step 308 is NO an error is judged at step 320. When the results of judgements executed at steps 305 and 308 are YES, the tool exchanger is moved to tool exchange position A, whereas when the results of judgements executed at steps 306 and 307 are YES, the tool exchanger is moved to tool exchange position B. In other words, tools in regions I and IV are exchanged at the tool exchange position A, whereas tools in the regions II and III are exchanged at the tool exchange position B by rotating the tool magazine in clockwise or counterclockwise direction in accordance with the position or number of steps of the designated tool. Following steps 311 and 312, at step 313 the designated tool number in the comparison table is changed to an absolute pot number. Then at step 314, the position of the designated tool with reference to a specific tool exchange position or a reference position is counted. Then at step 305 the tool magazine is stopped and at step 316 the designated tool is exchanged. In other respects, the modification shown in FIG. 3 operates in the same manner as the embodiment shown in FIG. 1.

What is claimed is:

1. A method of controlling a tool magazine of the type wherein a plurality of tools are mounted on tool pots of a single tool magazine and a designated tool is indexed to a tool exchange position under control of a computer including memory means, comprising the steps of:
    dividing said tool magazine into at least three regions each containing a plurality of tool pots for receiving tools of the same type;
    storing in said memory means, in the form of a comparison table, correspondence between absolute tool pot numbers with reference to said tool exchange position and tool numbers for respective tool pots in respective regions;
    determining a direction of movement of said tool magazine for respective regions with reference to said tool exchange position;
    judging a specific region containing a tool designated by a call instructions produced by a recording medium containing a machining program;
    indexing said judged specific region to said tool exchange position;
    counting an order of said designated tool in said judged specific region in accordance with said comparison table;
    moving said magazine in the determined direction by an amount corresponding to the counted order thereby indexing said designated tool to said tool exchange position; and
    exchanging said designated tool at said tool exchanged position with a tool mounted on a machine tool;
    whereby the time required to search for and exchange a tool is reduced.

2. The method according to claim 1 which further comprises the step of rewriting a tool number of said comparison table after movement of said magazine.

3. The method according to claim 1 which further comprises the steps of putting said tool which has been mounted on said machine tool before tool exchange into an empty tool pot and writing a tool number thereof into said comparison table.

4. The method according to claim 1 wherein prior to said various steps a judgement is made as to whether said magazine contains a designated tool or not, and when there is no designated tool an error display is made.

5. The method according to claim 1 wherein said magazine comprises a circular disc divided into four regions each provided with a plurality of tool pots at a peripheral portion of said disc and said magazine is rotated in a clockwise or counterclockwise direction toward tool exchange position along a path of less than 180°.

6. The method according to claim 1 which further comprises the steps of providing at least two spaced tool exchange positions for said tool magazine on one side thereof and selectively moving a tool exchanger to either one of said tool exchange positions for exchanging said designated tool brought to said tool exchange position with a tool mounted on said machine tool.

7. Apparatus for controlling a tool magazine having a plurality of tool pots each containing a tool, said tool magazine being divided into at least three tool regions respectively containing substantially the same number of tool pots for receiving tools of the same type, said apparatus comprising:
    reversible magazine driving means for sequentially indexing a designated tool to a tool exchange position;
    a first memory section including a comparison table storing correspondences between absolute pot numbers of respective regions and tool numbers included in respective regions;
    a second memory section including a first memory region for storing a tool number of a tool mounted on a machine tool, a second memory region for storing an absolute pot number of a tool pot indexed to said tool exchange position, a third memory region for storing the absolute pot number of a tool pot containing said designated tool and a fourth memory region for storing the designated tool number;

means for searching said absolute tool pot number storing said designated tool in accordance with said comparison table prior to movement of said tool magazine;

means for determining a direction of movement of respective regions of said tool magazine towards said tool exchange position in accordance with contents of said second memory section;

means controlled by the contents of said first and second memory sections for determining an amount of movement of said tool magazine necessary to index said designated tool to said tool exchange position; and magazine drive means controlled by said direction determining means and said movement amount determining means for indexing said designated tool to said tool exchange position.

8. The apparatus according to claim 7 which further comprises means for writing said searched absolute tool pot number into said third memory region, and means for writing said searched absolute tool pot number into said comparison table.

9. The apparatus according to claim 7 wherein said tool magazine comprises a circular disc, said magazine drive means comprises a step motor and said means for determining the amount of movement of said tool magazine comprises a counter which counts number of steps of said tool magazine rotated by said step motor.

10. In apparatus for controlling a tool magazine having a plurality of tool pots each containing a tool, a single tool magazine being divided into at least three tool regions respectively containing substantially the same number of tool pots for receiving tools of the same type and wherein said tool magazine is moved in one or opposite direction so as to index a designated tool to a tool exchange position where the designated tool is exchanged with a tool exchanger, the improvement wherein said tool magazine is provided with at least two spaced tool exchange positions on one side thereof and wherein there are provided means for moving said tool exchanger to either one of said tool exchange positions in accordance with a specific one of said tool regions which contains said designated tool, and means for determining the direction of movement of said tool magazine in accordance with the absolute tool pot number containing said designated tool with reference to either one of said tool exchange positions.

11. The apparatus according to claim 10 wherein said tool magazine takes the form of an endless chain divided into four tool regions, two spaced tool exchange positions are provided between adjacent tool regions on one side of said tool magazine, and said tool exchanger is selectively moved to either one of said tool exchange positions along a column.

12. Apparatus for controlling a tool magazine having a plurality of tool pots each containing a tool, said magazine being divided into at least three tool regions respectively containing substantially the same number of pots for receiving tools of the same type, said apparatus comprising:

means for providing at least two tool exchange posiitions between adjacent sections and on one side of said tool magazine;

means for driving said tool magazine to index a designated tool to either one of said tool exchange positions in one or opposite direction in accordance with an absolute pot number of said designated tool with reference to either one of said tool exchange positions;

means for selectively moving a tool exchanger to either one of said tool exchange positions;

first memory means including a plurality of memory regions respectively storing tool pot numbers corresponding to absolute tool pot numbers with reference to said tool exchange positions;

second memory means comprising a comparison table in which are stored correspondences among respective absolute tool pot numbers and tool numbers contained in said tool magazine;

means for searching said comparison table to read out said designated tool number;

counting means for counting number of steps of said designated tool with reference to either one of said tool exchange positions; and means for rewriting absolute pot numbers and tool numbers stored in said comparison table when said tool magazine is moved.

13. The apparatus according to claim 12 wherein said second memory means stores a tool number mounted on a spindle of a machine tool and the absolute tool pot number of said designated tool at either one of said tool exchange positions, and wherein said apparatus further comprises means for rewriting said tool number on said spindle and said absolute tool pot number at the time of exchanging said designated tool with said tool on said spindle.

* * * * *